United States Patent [19]
Meli et al.

[11] Patent Number: 5,809,196
[45] Date of Patent: Sep. 15, 1998

[54] DISPERSION-SHIFTED OPTICAL FIBERS FOR WAVELENGTH DIVISION MULTIPLEXING

[75] Inventors: Fausto Meli, Piacenza; Giorgio Grasso, Monza, both of Italy

[73] Assignee: Pirelli Cavi S.p.A., Milan, Italy

[21] Appl. No.: 768,129

[22] Filed: Dec. 17, 1996

Related U.S. Application Data

[62] Division of Ser. No. 569,655, Dec. 8, 1995.

[51] Int. Cl.$^6$ .............................. G02B 6/02; G02B 6/16
[52] U.S. Cl. .......................................... 385/123; 359/615
[58] Field of Search ..................................... 359/615, 160, 359/161, 173, 341, 332, 355, 356, 565, 569, 571; 385/24, 28, 27, 115, 124, 127, 161, 31; 356/73.1

[56] References Cited

U.S. PATENT DOCUMENTS

| | | | |
|---|---|---|---|
| 4,799,790 | 1/1989 | Tsukamoto et al. | 356/73.1 |
| 5,033,846 | 7/1991 | Hernday et al. | 356/73.1 |
| 5,185,827 | 2/1993 | Poole | 385/28 |
| 5,189,483 | 2/1993 | Inagaki | 356/73.1 |
| 5,261,016 | 11/1993 | Poole | 385/28 |
| 5,327,516 | 7/1994 | Chraplyvy et al. . | |
| 5,546,210 | 8/1996 | Chraplyvy et al. . | |
| 5,559,910 | 9/1996 | Taga et al. . | |
| 5,602,666 | 2/1997 | Ishikawa et al. . | |

FOREIGN PATENT DOCUMENTS

| | | |
|---|---|---|
| 0439867 | 8/1991 | European Pat. Off. . |
| 0626768 | 11/1994 | European Pat. Off. . |

OTHER PUBLICATIONS

Technical Report of IEICE (The Institute of Electronics, Information and Communication Engineers), SSE93–143, 00593–73 (1994–03), pp. 13–18.—Hideyuki Miyata, Hiroshi Onaka, Kazue Otsuka, Terumi Chikama "A Study on Four–Wave Mixing in WDM Transmission Systems With Longitudinal Distribution of Optical Fiber Dispersion." (English Translation).

Journal of Lightwave Technology, Oct. 1993, vol. 11, No. 10, pp. 1615–1621, Naoya Henmi et al., "A New Design Arrangement of Transmission Fiber Dispersion for Suppressing Nonlinear Degradation in Long–Distance Optical Transmission Systems with Optical Repeater Amplifiers."

Journal of Lightwave Technology, Nov. 1992, vol. 10, No. 11, pp. 1553–1561, Kyo Inoue, "Four–Wave Mixing in an Optical Fiber in the Zero–Dispersion Wavelength Region."

Journal of Lightwave Technology, Sep. 1990, vol. 8, No. 9, pp. 1402–1408, Mari W. Maeda et al., "The Effect of Four–Wave Mixing in Fibers on Optical Frequency–Division Multiplexed Systems."

*Primary Examiner*—Akm E. Ullah
*Attorney, Agent, or Firm*—Finnegan, Henderson, Farabow, Garrett & Dunner L.L.P.

[57] ABSTRACT

An optical telecommunication system has at least two sources of optical modulated signals at different wavelengths in a predetermined transmission wavelength band, together with a multiplexer for the signals, an optical fiber line connected at one end to the multiplexer, and a demultiplexer/receiver for the signals. The line comprises an optical fiber having a chromatic dispersion value lower than a predetermined value in the transmission wavelength band and increasing as wavelength increases. The fiber also has a zero value of chromatic dispersion at a wavelength lower than the minimum wavelength of the transmission wavelength band by such an amount that no local wavelength zero value of the chromatic dispersion present in the fiber and capable of generating a four-wave-mixing phenomenon is included in the band.

8 Claims, 9 Drawing Sheets

DISPERSION-SHIFTED OPTICAL FIBERS FOR WAVELENGTH DIVISION MULTIPLEXING

This application is a division of application Ser. No. 08/569,655, filed Dec. 8, 1995.

BACKGROUND OF THE INVENTION

The present invention relates to a wavelength-division multiplexing (WDM) telecommunication system using dispersion-shifted optical fibres, in which noise effects due to the so-called "Four Wave Mixing" (FWM) are avoided.

In the most recent telecommunication engineering, it is known to use optical fibres for sending optical signals of a predetermined frequency to carry information to be remotely communicated. It is also known that the optical signal sent through an optical fibre undergoes an attenuation during its travel, which necessitates amplification by means of respective amplifiers disposed at predetermined intervals along the line.

Optical amplifiers are conveniently used to achieve the required amplification. With optical amplifiers, the signal is amplified while remaining in an optical form, that is, without detection and regeneration of the signal. These optical amplifiers are based on the properties of a fluorescent dopant, such as erbium for example, which, when suitably excited by application of optical pumping energy, has a high emission in the wavelength band corresponding to the band of minimum attenuation of the light in the silica-based optical fibres.

The optical fibres used for transmission have a chromatic dispersion, which is due to the material that forms them and the refractive index profile, that varies with the wavelength of the transmitted signal and that goes to zero at a given value of the wavelength itself. This chromatic-dispersion phenomenon substantially consists of a widening in the duration of the pulses forming the signal during their travel through the fibre. This widening is due to the fact that the different chromatic components of each pulse are characterized each by its own wavelength and travel in the fibre at different speeds. Following this widening, temporally successive pulses that are well separated at the transmitter, can partially overlap at the receiver, after their travel through the fibre. They may even be no longer distinguishable as separate values, causing an error in the reception.

Fibres of the so-called "Step Index" (or SI) possess such optical features that the chromatic dispersion goes to zero at a wavelength value of about 1300 nm. Therefore, SI fibres at wavelengths close to 1500 nm, which is used for telecommunication, have an important value of chromatic dispersion capable of constituting a limit to the transmission speed. That is, SI fibres limit the possibility of sending a high number of successive pulses in a predetermined unit time without incurring errors at the receiver.

Also known are the so-called dispersion shifted fibres or DS fibres in which the zero point of the chromatic dispersion is shifted. DS fibres substantially are fibres that have optical features suitably selected to bring the zero point of the chromatic dispersion to a wavelength value in the range of 1500 to 1600 nm, which is commonly used for telecommunications. Fibres of this type are defined in the ITU-T G.653 Recommendation of March 1993, in which the chromatic dispersion of the fibre is provided to nominally go to zero at a $\lambda_0$ wavelength value of 1550 nm, with a tolerance of 50 nm. These fibres are available for example from Corning N.Y. (USA) under the trade name SMF/DS (Registered Trademark) and from Fibre Ottiche Sud S.p.A. (FOS), Battipaglia (IT) under the trade name SM DS. Fibres of the above type are also described in U.S. Pat. No. 4,715,679, U.S. Pat. No. 4,822,399, and U.S. Pat. No. 4,755,022, for example.

It is also known that the need to send increasing amounts of information over the same transmission line has led to the sending of more transmission channels over the same line by a so-called "Wavelength Division Multiplexing" (or WDM) process. According to this technique, more channels consisting of analog or digital signals are simultaneously sent over the line consisting of a single optical fibre, and the channels are distinguished from each other in that each of them is associated with its own wavelength in the employed transmission band. This technique enables the number of the transmitted pieces of information per unit time to be increased, where the pieces of information are distributed among several channels and the transmission speed on each channel is the same.

It has been found however, that a WDM transmission through dispersion-shifted single-mode optical fibres gives rise to an intermodulation phenomenon between the channels, known as "Four Wave Mixing" or FWM. This phenomenon arises, in general, when the presence of three optical signals in the fibre gives rise to a fourth signal which can overlap the others, thereby reducing the system performance. This phenomenon is described for example in JOURNAL OF LIGHTWAVE TECHNOLOGY, Vol. 8, No. 9, September 1990, Pages 1402–408. The effect is due to non-linear third-order phenomena that can become very strong due to the high field intensity in the fibre core and at the high interaction lengths between the signals. In greater detail, the same publication points out that, for a particular optical fibre, the greatest generation efficiency of the fourth wave (that is the noise effect in the system) is reduced by increasing the differences between the signal frequencies, the chromatic dispersion or the transmission length, due to the increased phase shift between the signals. In the case in which the optical fibre is a low-chromatic dispersion fibre (the above described DS fibre, for example) and has a small efficient area of interaction between the optical frequencies (signal-mode fibre), the non-linearity resulting from generation of the fourth wave can become a limit to transmission, in that the intermodulation products can fall within the receiving band and give rise to a noise source. The solution proposed in the above mentioned publication for planning WDM systems consists of considering the distance between the wavelengths of the different channels and the signal powers.

U.S. Pat. No. 5,327,516 discloses an optical fibre for WDM telecommunication systems that has an absolute value of the mean chromatic dispersion at 1550 nm included in a range between 1.5 and 4 ps/(nm.km) and a slope of the lower dispersion curve at 0.15 ps/(nm².km) in a fibre portion not shorter than 2.2 km. As made clear in the text (column 3, lines 1–5), these features of the optical fibre substantially introduce a small degree of linear dispersion which produces a phase shift between the optical channels sufficient to avoid the above described non-linearity effects.

JOURNAL OF LIGHTWAVE TECHNOLOGY, Vol. 10, No. 11, November 1992, pages 1553–1561 reports the existence of another condition at which the efficiency of the fourth-wave generation becomes maximum. The article points out that the condition occurs when two of the three optical carriers have wavelengths symmetrical with each other with respect to a wavelength of zero dispersion, or when one optical carrier has the same wavelength as the wavelength that brings the dispersion to zero. The same publication mentions the fact that, for disturbance in the line created during the fibre manufacturing process, the wavelength value that brings the dispersion to zero fluctuates along the fibre length. From experiments conducted by varying the optical pump frequency about the zero-dispersion wavelength, together with a test signal at a fixed wavelength of 1557.7 nm, the author detected different peak values for 2.5 km long fibre portions drawn from a single preform. This means that the wavelength of zero chromatic dispersion in each of the tested fibres was different even when the fibres had been drawn from the same preform. The difference between the detected zero dispersion frequencies was in the order of 100 GHz (corresponding to 0.8 nm wavelength). With 10 km long fibres, a quick reduction in the FWM efficiency was observed with the increase of the distance between the channel frequencies. As a consequence of these results, this publication concludes that the manufacture of a uniform fibre is necessary in order that one may be able to operate in a wider wavelength range.

JOURNAL OF LIGHTWAVE TECHNOLOGY, Vol. 1, No. 10, October 1993, pages 1616–1621 reports a method and a fibre arrangement capable of eliminating noises resulting from the non-linearity of the transmission system by using speed dispersion fibres of the "normal" group (D<0) as the transmission fibre and by introducing a short fibre portion of "anomalous" dispersion (D>0) in order to bring the dispersion to zero again over the whole length included between two repeaters. This publication takes into account the case of FWM phenomena between optical channels and amplified spontaneous emission in single-channel and very long-distance systems.

SUMMARY OF THE INVENTION

In one aspect, the present invention relates to an optical telecommunication system having at least two sources of optical signals modulated at different wavelengths, included in a predetermined transmission wavelength band, at a predetermined transmission speed; means for multiplexing said signals for input to a single optical fibre; an optical-fibre line connected at one end to said multiplexing means; and means for receiving said signals comprising optical demultiplexing means for the signals themselves depending on the respective wavelength.

The signals have an optical power of a value greater than a predetermined value in at least one portion of the optical-fibre line, which line comprises an optical fibre having a chromatic dispersion value lower than a predetermined value in said transmission wavelength band. The optical fibre has a chromatic dispersion that increases with the wavelength increase, exhibiting a zero value at a wavelength lower than the minimum wavelength of the band by such an amount that no local zero value of chromatic dispersion present in the fibre and capable of generating a four-wave-mixing phenomenon, is included in the band.

In particular, the wavelength value bringing the chromatic dispersion to zero is lower by at least 10 nm than the minimum wavelength of the transmission band. Preferentially, the wavelength value bringing the chromatic-dispersion to zero is lower than or equal to 1520 nm and, more preferentially, is included between 1500 and 1520 nm. Preferably, the chromatic dispersion value in the fibre is lower than 3 ps/(nm.km) in the predetermined transmission band. Also preferably, the predetermined optical power value in at least one portion of the line is not lower than 2 mW per channel.

In a particular embodiment, a system consistent with the invention comprises at least one optical amplifier interposed along the optical line. In particular, the optical amplifier has a signal-amplifying band comprising the predetermined wavelength band and, preferentially, the signal amplifying band is included between 1530 and 1570 nm. In a particular embodiment, the system comprises at least four optical amplifiers.

In a second aspect, the present invention relates to an optical fibre for transmitting at least two optical signals in a predetermined transmission wavelength band. The fibre has a chromatic dispersion, measured over a length of at least 10 km, which becomes zero for a wavelength value included in a predetermined interval. The maximum value of the interval is lower than the minimum wavelength of the band by such an amount that substantially no local wavelength value bringing the local chromatic dispersion to zero is included in the band, but which is present in the fibre over a length portion capable of generating intermodulation peaks of said signals. In particular, each of the wavelength zero values of the local chromatic dispersion differs by less than 10 nm from the wavelength zero value of the overall chromatic dispersion in the fibre. Also in particular, the optical fibre according to the invention has a chromatic dispersion lower than 3 ps/(nm.km) in the transmission band, and it becomes zero for a transmission value lower by at least 10 nm than the minimum wavelength value of the band.

In another aspect, the optical fibre consistent with the invention is characterized in that, for an overall fibre length greater than 100 km, it has a chromatic dispersion of such a value that intermodulation peaks are not generated in the presence of at least two optical signals over several channels of different wavelengths, the power of which being at least 3 mW per channel fed to a fibre end, and the intensity of which causing a signal/noise ratio lower than 20.

In a further aspect, the present invention relates to a process for transmitting optical signals at a predetermined transmission speed, including the steps of generating at least two modulated optical signals of predetermined wavelengths included in a predetermined transmission band, the wavelengths being different from each other by at least 2 nm, feeding said signals to a single-mode optical fibre having a chromatic dispersion lower than 3 ps/(nm.km) in the transmission band and a zero point of the chromatic dispersion at a predetermined wavelength, amplifying the optical signal at least once by at least one optical active-fibre amplifier, transmitting said signals over a distance of at least 50 km, and receiving said signal through a demultiplexing receiver. The power of the signals in at least one portion of the fibre is higher than a value capable of causing noise due to a four wave mixing between the channels, characterized in that the minimum wavelength value of the transmission band is higher by a given amount than the wavelength value bringing the chromatic dispersion to zero, which amount has such a value that in no efficient fibre portion the chromatic value in the band becomes zero. Preferentially, the minimum wavelength of the transmission band is higher than the zero value of the chromatic dispersion by at least 10 nm. More preferentially, the wavelength value bringing the chromatic dispersion to zero is included between 1500 and 1520 nm. Preferably, the predetermined transmission speed is higher than or equal to 2.5 Gbit/s. Also preferably, the power value of the signals in the optical fibre capable of causing noise as a result of a four wave mixing between the channels, is at least 3 mW per channel.

According to a further aspect, the present invention concerns an optical fibre for transmitting optical signals sensitive to non-linear phenomena in a predetermined transmission wavelength band, characterized in that it has a chromatic dispersion lower than a predetermined value in the band and which becomes zero for a wavelength value included in a predetermined interval, the maximum value of which is lower than the minimum wavelength of the band by such an amount that substantially no local wavelength value bringing the local chromatic dispersion to zero is included in the band, but which is present in the fibre over a length portion capable of generating spectral modification of said signals. Preferably, each of the wavelength zero values of the local chromatic dispersion differs by less than 10 nm from the wavelength zero value of the overall chromatic dispersion in the fibre.

In particular, the optical fibre has a chromatic dispersion lower than 3 ps/(nm.km) in the transmission band, which becomes zero for a wavelength value lower by at least 10 nm than the minimum wavelength value of the band. Preferably, the predetermined transmission wavelength band ranges from 1530 to 1560 nm.

It is to be understood that both the foregoing general description and the following detailed description are exemplary and explanatory only and are not restrictive of the invention, as claimed. The accompanying drawings, which are incorporated in and constitute a part of this specification, illustrate several embodiments of the invention and together with the description, serve to explain the principles of the invention.

BRIEF DESCRIPTION OF THE DRAWINGS

More details will become apparent from the following description, with reference to the accompanying drawings, in which.

DESCRIPTION OF THE PREFERRED EMBODIMENTS

Reference will now be made in detail to the present preferred embodiment of the invention, examples of which are illustrated in the accompanying drawings. Wherever possible, the same reference numbers will be used throughout the drawings to refer to the same or like parts.

EXPERIMENT 1

Figure 1:
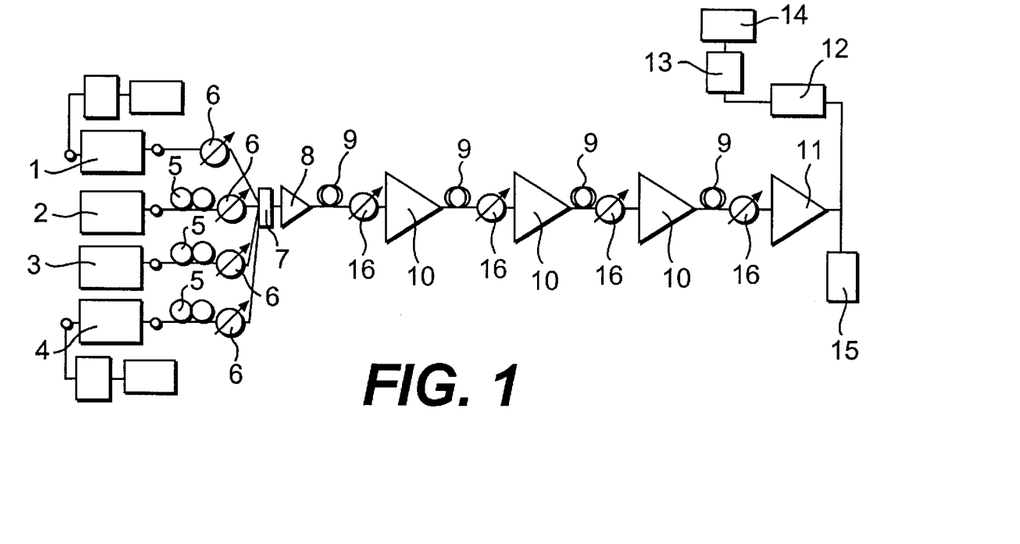
FIG. 1 is a diagram showing an experimental transmitting apparatus.

An experimental apparatus for detecting four wave mixing (FWM) phenomena in an amplified transmission system and for evaluating the resulting noise effect in the transmission is shown in FIG. 1.

This apparatus comprised an externally-modulated laser 1, having a fixed wavelength of 1557 nm; two lasers 2, 3 of a wavelength varying within the range of 1530–1560 nm; and an externally-modulated laser 4 of a fixed 1550 nm wavelength. In experiment 1, laser 4 was inactive. Lasers 1, 4 consisted of interfacing devices available from Applicants' assignee under the trade name TXT-EM, system T31. Lasers 2, 3 consisted of external-cavity lasers (ECL), model TSL-80 produced by SANTEC, Micom Valley Thkadai, Kamisue, Komaki, Aichi 485 (JP) and model HP81678A produced by HEWLETT PACKARD COMPANY, Rockville, Md. (USA), respectively.

Signals generated by lasers 2, 3 of variable wavelength were sent to polarization controllers 5 and attenuators 6, for channel balancing. The polarization controllers 5 consisted each of two elements formed of optical fibre coils, type SM, with a diameter of about 20–40 nm, swinging about an axis to maximize the polarizing alignment of the different channels.

The three generated carriers were sent to the inlets of a passive optical combiner 1×4 7, by which signals were combined in a single output optical fibre. The adopted combiner was a melted-fibre combiner, model 1×4 SMTC-0104-1550-A-H commercialized by E-TEK DYNAMICS INC., 1885 Lundy Ave., San Jose, Calif. (USA). Signals were fed to a booster 8 and from the booster to an optical line comprising four optical fibre portions 9, each of them being 60 km long, and having three optical line amplifiers 10 interposed therebetween.

A pre-amplifier 11 was connected to the end of the last optical fibre portion. Pre-amplifier 11 was a RPA/E-MW Model, available from Applicants' assignee. The pre-amplifier 11 outlet was connected, through a Fabry-Perot filter 12, to a termination 13 (Philips SDH at 2.5 Gb/s) provided with an error measuring (BER) apparatus 14 and, alternatively to an optical spectrum analyzer 15, of the monochromator type, model MS9030A/MS9701B, produced by ANRITSU CORPORATION, 5-10-27 Minato-ku, Tokyo (JA). The overall powers sent from the line amplifiers to the individual optical fibre portions were about 13 dBm; the equivalent fibre lengths were about 23 dB (part of the attenuation was introduced through attenuators 16). Booster 8 was a TPA/E-MW model produced by Applicants' assignee. Line amplifiers 10 were an OLA/E-MW model, also produced by Applicants' assignee. A more detailed description of the line amplifiers is given below.

The optical fibres 9 used in Experiment 1 were dispersion shifted fibres SM-DS produced by FOS, having the following nominal features:

| | |
|---|---|
| Wavelength for bringing the chromatic dispersion to zero | $\lambda o = 1540$ nm; |
| Chromatic dispersion at 1550 nm | $Dc = 1 ps/(nm \cdot km)$ |
| Slope of the chromatic dispersion curve | $Dc' = 0.11 ps/(nm^2 \cdot km)$ |
| Mode diameter | $MFD = 8.1 \mu m$ |
| Cutoff wavelength (LP11 cut-off) | $\lambda c = 1230$ nm. |

The unitary chromatic dispersion of the fibre was measured following the phase shift technique, according to Recommendation ITU-T G.650 of March 1993 (the adopted fibre length for measurement was 1–2 km).

Figure 5:
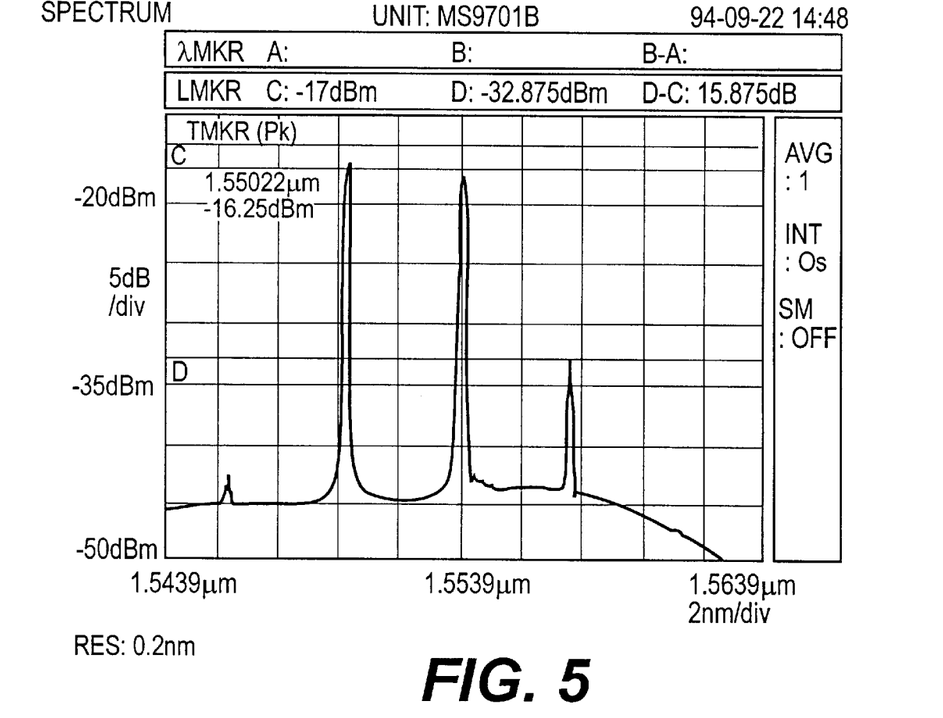
FIG. 5 shows the spectrum detected in a two-channel transmission test using the apparatus of FIG. 1 and a commercial DS fibre.

By first operating the variable-wavelength lasers 2, 3 and detecting the received spectrum, a product of considerable FWM was found when one of the external-cavity lasers (2) had been positioned at 1554 nm whereas the other (3) had been kept at 1548 nm. Then the external-cavity laser 2 was maintained at the above wavelength and the other external-cavity laser was moved to 1550.37 nm, so that the FWM intermodulation product could be at a 1557 nm fixed wavelength of the external-modulation laser 1. The spectrum thus obtained is shown in FIG. 5. Under the above conditions, laser 1 was then turned on and connected to the line termination 13 at 2.5 Gb/s, thereby creating a case of complete overlap between the signal and the FWM intermodulation product, in order to measure the noise amount generated by same.

Figure 2:
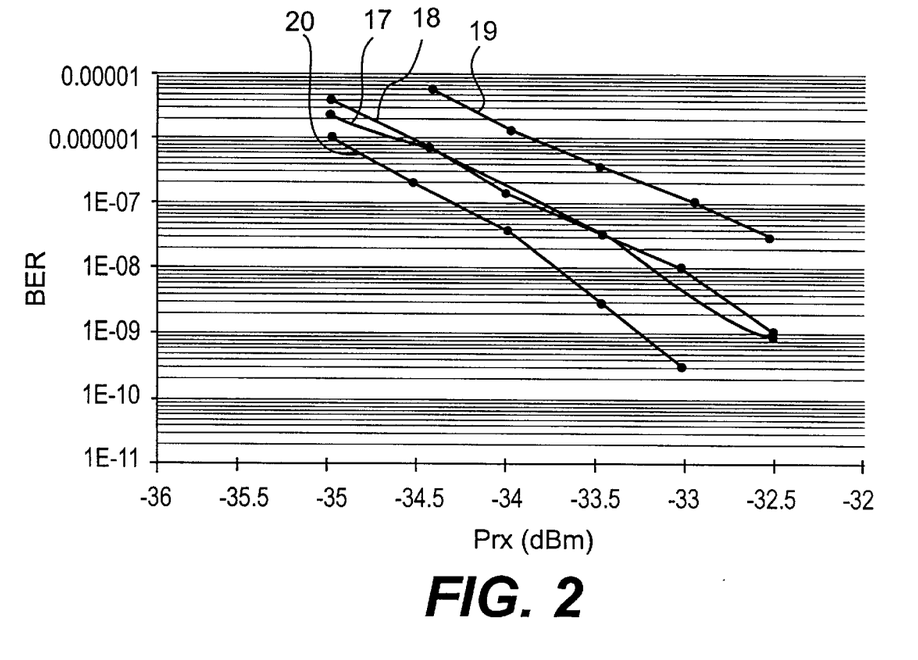
FIG. 2 is a diagram showing the BER (Bit Error Rate) curves measured for different S/N values depending on the power at the reception in a transmission test with the apparatus of FIG. 1.

Through filter 12, the BER level was measured so as to check the penalty due to crosstalk with different values of the signal/noise (S/N) ratio, obtained by varying the power values of the input signal, acting on the relative attenuator 6. The obtained result is shown in FIG. 2, which reproduces the BER curves 17, 18, 19 detected under conditions in which S/N=14.7 dB, 13.3 dB and 11 dB respectively. Curve 20 was detected in the absence of FWM, as described in the following Experiment 8.

As can be viewed from FIG. 2, with a S/N ratio=14.7 dB, at a BER of $10^{-9}$, the presence of the FWM peak gives origin to a penalty of about 0.8 dB with respect to the case of FWM absence. Crosstalk between curves with S/N=14.7 and S/N= 13.3 dB are deemed to be caused by FWM swingings due to a variation in the polarization state of the signals during measurement. Should the two carriers generating the FWM also carry an SDH frame at 2.5 Gb/s, even a greater penalty can be expected.

EXPERIMENT 2

Figure 3:
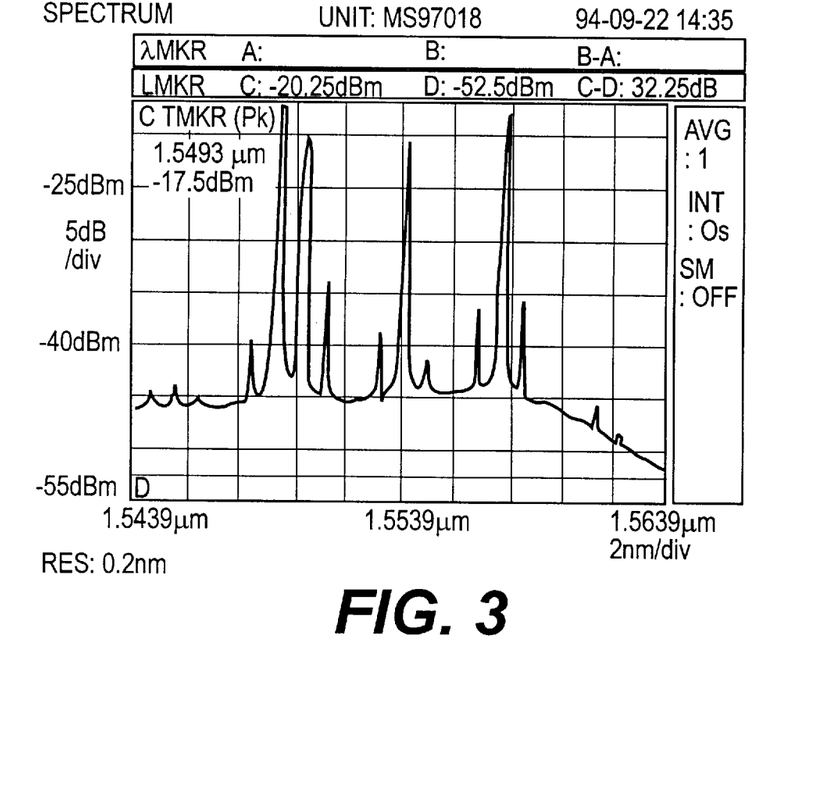
FIG. 3 shows the spectrum detected in a four-channel transmission test, with the apparatus of FIG. 1 and a commercial DS fibre.

Using the experimental apparatus described above and shown in FIG. 1, a transmission test was also carried out when, in addition to the above three carriers, there was a fourth carrier generated by laser 4 at 1550 nm. The receiving spectrum shown in FIG. 3 was detected. In this case, one can see that the spectrum contains several peaks, in addition to the signals, due to the FWM effects given by the combination of the cases in which there is one carrier on λo, and two carriers symmetrical to λo, where the two carriers have close frequencies.

EXPERIMENT 3

Figure 4:
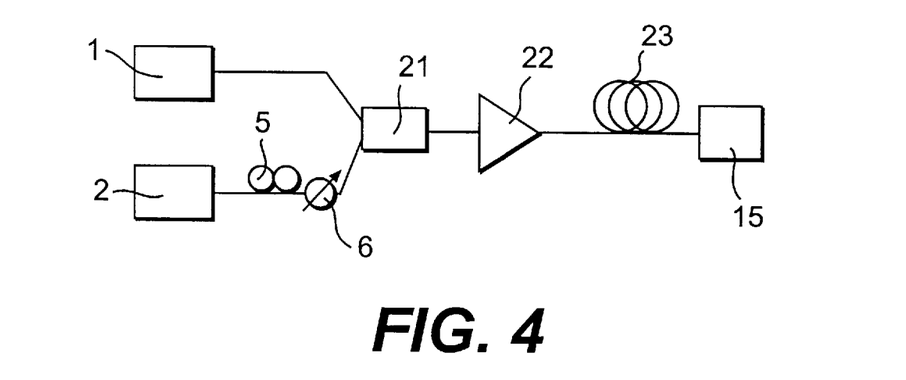
FIG. 4 shows the diagram of a test apparatus for observing the FWM effects in a single fibre.

In order to examine the effects given by the fibres used for transmission on the FWM phenomenon, a simplified experimental apparatus was prepared, as shown in FIG. 4. The apparatus was formed of an external-cavity laser 1, for generating a fixed-wavelength optical carrier and an external-cavity laser 2 for generating a variable-wavelength optical carrier. The output fibres from both lasers were fed to an optical coupler 21. At the laser 2 outlet, there was the polarization controller 5 and attenuator 6 for balancing the optical powers between the two channels.

At the optical coupler 21 outlet, there was a booster 22, connected to one end of an optical transmission fibre 23, which terminated at the entry of the spectrum analyzer 15. The optical coupler 21 was a fused-fibre coupler model 1×2 produced by the above E-TEK. Booster 22 was an AMPLI-PHOS (Registered Trademark) model, produced and commercialized by Applicants' assignee, having a saturation power of +15 dBm. Lasers 1 and 2 were the same ECL lasers of Experiment 1, already described and produced by SAN-TEC and HEWLETT-PACKARD, respectively. The wavelength of laser 1 was fixed to λ=1556.54 nm. The spectrum analyzer 15 was the already described monochromator ANRITSU. The optical fibre used in the test was a SM-DS FOS fibre, and it was 5 km long.

Figure 6:
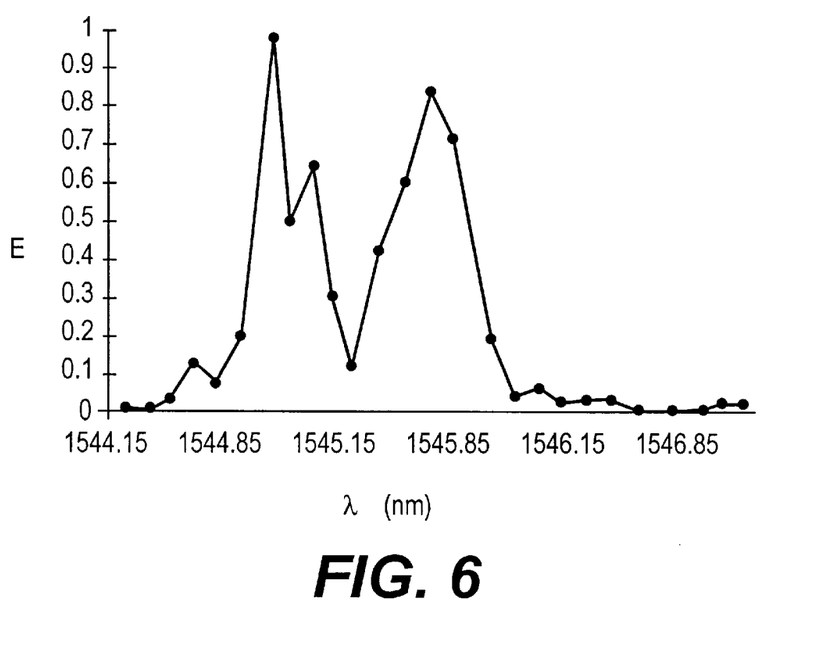
FIG. 6 is a diagram showing the detected FWM efficiency on a commercial 5 km long DS fibre.

The wavelength generated by laser 2 was caused to vary with steps of 0.1 nm each. The graph shown in FIG. 6 was obtained with the spectrum analyzer 15. It shows the standardized efficiency $E=P_{FWM}/P_{FWM}max$ for generating peak f221 of FWM with a fixed wavelength channel, on varying of the wavelength of the second channel. In particular, in the range included between 1544 and 1547 nm, two efficiency maxima were detected, for example, and they are deemed to be due to the presence of two different λo values in the fibre, at 1544.85 and 1545.55 nm, respectively.

EXPERIMENT 4

Figure 7:
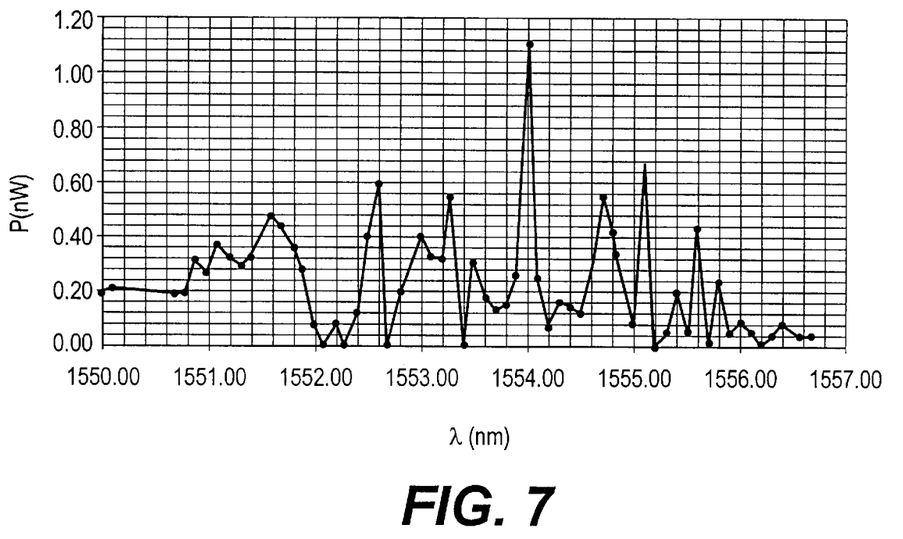
FIG. 7 is a diagram showing the detected FWM efficiency on a commercial 60 km long DS fibre.

Following the same methods as in Experiment 3, but using a 60 km long fibre, another experiment was conducted. Shown in FIG. 7 is the measurement result of power P of the f221 FWM peak on the fibre having a length L=60 km, obtained with a 1545.2 nm fixed wavelength laser and a variable laser varying with steps of 0.1 nm each in a range included between 1550 and 1557 nm. The power measurement was standardized at optical carriers of 1 mW input power, according to the relation $$P_{FWM} \text{(standard)} = \frac{P_{FWM}}{Pin_1 \cdot Pin_2^2}$$

wherein $Pin_1$, $Pin_2$ are power values of the optical input carriers. From the graph, one can see the existence of several FWM efficiency peaks that have been given to different λo values locally present along the fibre.

EXPERIMENT 5

The same methods as in Experiment 4 were applied to another experiment carried out using an ECL laser having a 1525 nm fixed wavelength and an ECL laser of variable wavelength, connected to a commercial DS fibre produced by FOS, having the following features:

| | |
|---|---|
| Wavelength bringing the (nominal) chromatic dispersion to zero | $\lambda o = 1525$ nm; |
| Chromatic dispersion at 1550 nm | $Dc = 3 ps/(nm \cdot km)$ |
| Slope of the chromatic dispersion curve | $Dc' = 0.12 ps/(nm^2 \cdot km)$ |
| Length | $L = 60$ km |

Figure 8:
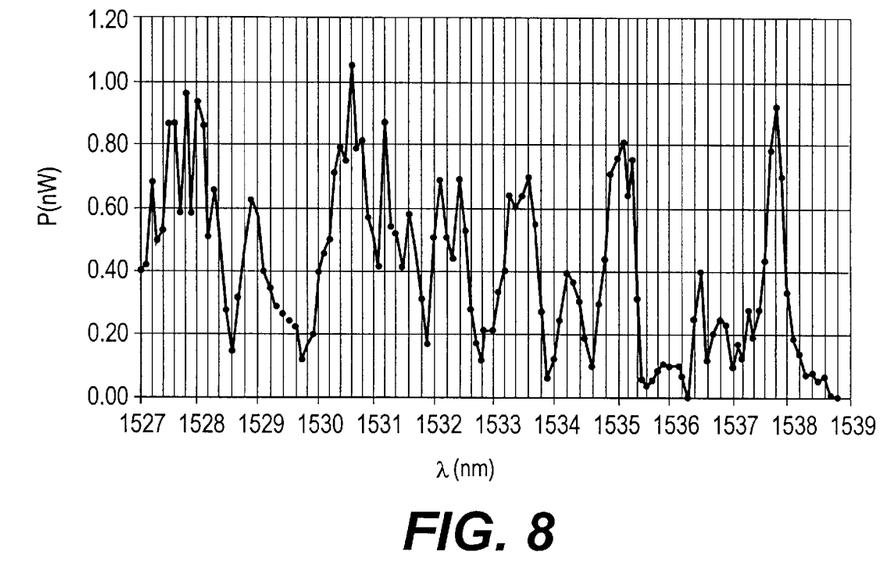
FIG. 8 is a diagram showing the detected FWM efficiency on a different commercial 60 km long DS fibre.

FIG. 8 shows the power of the FWM peaks $P_{FWM}$, standardized at Pin=1 mW, in the band included between 1527 and 1539 nm. This experiment shows that the fibre has FWM efficiency peaks attributable to the presence of several λo values distributed in the 1527–1539 nm band, although its nominal λo is at a different (1525 nm) wavelength.

EXPERIMENT 6

A simulation test based on a numeral value described in JOURNAL OF LIGHTWAVE TECHNOLOGY, VOL. 10, No. 11, November 1992, pages 1553–1561, was conducted by simulating an optical transmission fibre similar to the one measured in the preceding experiment, and formed of 30 segments, each of them having a λo value randomly distributed between 1527 and 1539 nm (the same band as that in which FWM peaks attributed to local λo, had been experimentally observed). The calculation data of the fibre was:

| | |
|---|---|
| attenuation | α = 0.28 dB/km |
| index of refraction of glass n = | 1.45 |
| mode diameter | MFD = 8 μm |
| non-linear susceptibility of the third order | $c_{1111} = 4.26 \cdot 10^{-14}$ m$^3$/J |
| Slope of the chromatic dispersion curve | Dc' = 0.12 ps/(nm$^2$ · km) |
| Length | L = 60 km |

Figure 9:
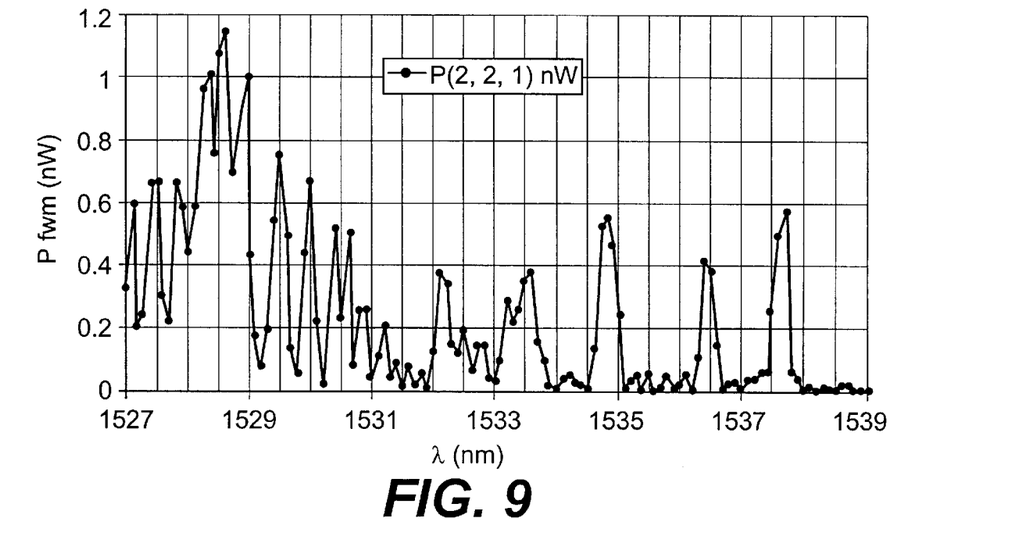
FIG. 9 is a diagram showing the simulated-FWM efficiency for the fibre shown in FIG. 8.

The calculated standardized power of the FWM peaks $P_{FWM}$ at the different wavelengths λ is shown in FIG. 9.

From a comparison between FIGS. 8 and 9, a profile of FWM peaks is detected that is quite similar in terms of quality to the peak experimentally detected with a single optical fibre of the commercial type. Such a result makes one think that a distribution of the type assumed for simulation gives results quite similar to those detectable through experiments in the real fibre (in the examined wavelength band).

EXPERIMENT 7

Figure 10:
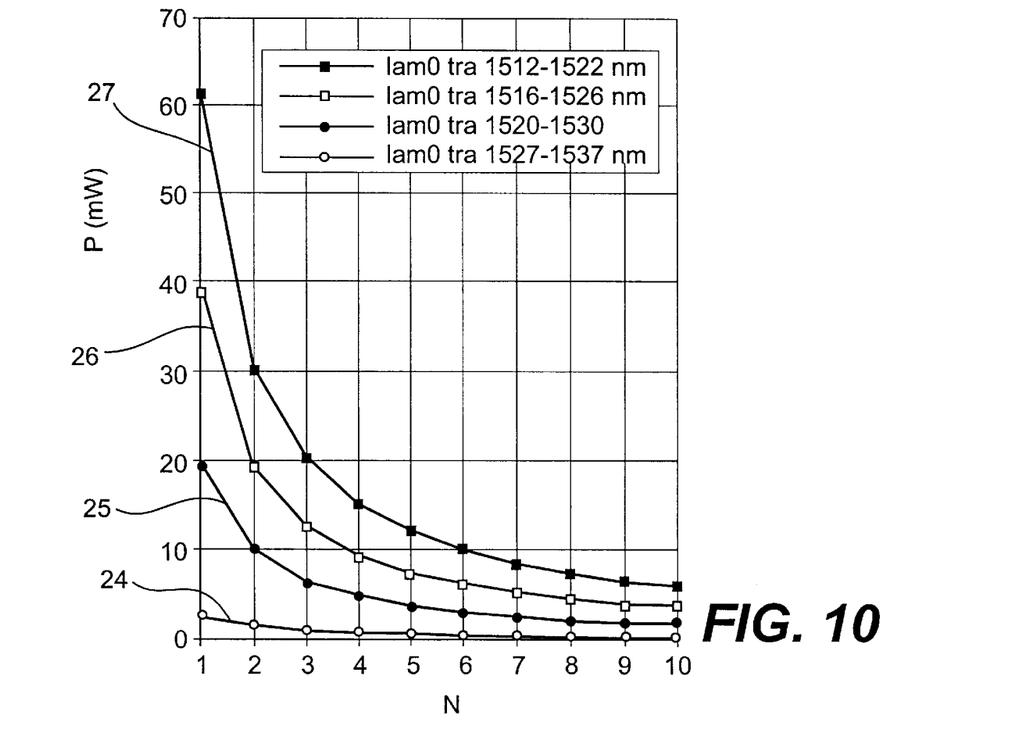
FIG. 10 is a calculated diagram of the maximum admissible powers per channel in an 8-channel amplified transmission system, with 100 km long portions, using fibres of the DS type having local λo values distributed among various areas of the spectrum.

Using the same algorithm as stated above, a simulation of an amplified optical line was performed. It consisted of N portions of optical DS fibre, each having a length of 100 km. The apparatus was simulated as shown in Experiment 6, related amplifiers being interposed in order to compensate for attenuation, in a system comprising 8 channels spaced apart the same distance from each other, between 1530 and 1545 nm. Curves shown in FIG. 10 represent the maximum transmissible power P for each channel with a S/N ratio ≧20 dB, depending on the N number of optical fibre portions and related amplifiers. Curves 24, 25, 26, 27 respectively correspond to fibre simulations having λo values included between 1527 and 1537 nm, 1520 and 1530 nm, 1516 and 1526 nm, and 1512 and 1522 nm.

As shown in the figure, with a fibre having λo values included between 1527 and 1537 nm it is not possible, already after one or two fibre portions, to observe the required S/N level without the maximum power going under 2–3 mW per channel. Also with a fibre having λo values included between 1520 and 1530 nm, it appears to be impossible to make more than four DS fibre portions, each of them being 100 km long and having the related amplifiers interposed, without the maximum transmissible power going under 5 mW/channel.

It should be noted that the presence of noise due to spontaneous emission (ASE) in the amplified optical lines requires, on the other hand, that the transmitted power level be kept sufficiently high in order not to penalize the S/N ratio. This requirement increases with an increase in the number of amplifiers present. Just as an indication, for a system having 6 amplifiers and 100 km long fibre portions, at least 3–6 mW per channel are required in order not to have important penalties due to ASE 8 (at 2.5 Gb/s).

EXPERIMENT 8

A new test was made using the experimental apparatus shown in FIG. 1, in which the commercial DS fibre of Experiment 1 was replaced with a DS fibre having the following features.

| | |
|---|---|
| Wavelength bringing the (nominal) chromatic dispersion to zero | λo = 1520 nm; |
| Distribution at 3s = | ±10 nm |
| Chromatic dispersion between 1530 and 1560 nm | Dc = 0.7–3 ps/(nm · km) |
| Slope of the chromatic dispersion curve (at 1550 nm) | Dc' = 0.11 ps/(nm$^2$ · km) |
| Efficient area | $A_{eff}$ = 50–60 μm. |

Figure 11:
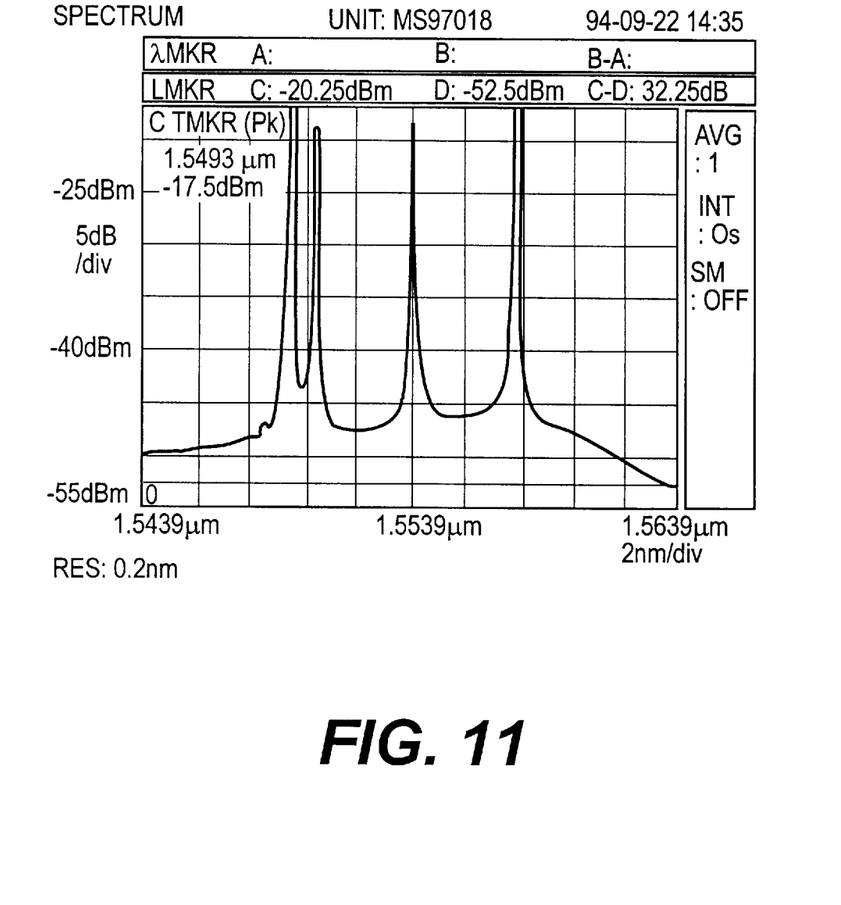
FIG. 11 shows the detected spectrum using the apparatus of FIG. 1, and a fibre according to the invention.

The spectrum at reception under the above conditions is shown in FIG. 11, whereas the BER curve measured under the above conditions is curve 20 in FIG. 2. As shown in FIG. 11, no important FWM peaks appear, and the curve of FIG. 2 shows that, with BER of $10^{-9}$, a power at reception up to about −33.3 dBm can be accepted, which power is greatly lower than that required for the same BER level with known fibres.

Based on the experiments and simulations carried out, the noise phenomena in the optical fibres of DS type known in the art, due to mixing between the channels, are deemed to result from the fact that these fibres have a wavelength value bringing the chromatic dispersion to zero that does not keep constant in the optical fibre length, even if drawn from the same preform. The wavelength value is on the contrary subjected to local variations of a far greater amount than stated in the literature, and these variations are of such an amount that in some fibre portions the local λo value falls within the transmission band of the erbium-doped amplifiers. Consequently, the transmitted channels interact with each other and cause the observed mixing phenomena.

According to one aspect of the present invention, it is therefore possible to make an optical fibre having a shifted zero point of the chromatic dispersion, which is adapted to eliminate the non-linearity phenomena due to the FWM and in particular due to the non-linearity of the average index of refraction of the fibre, in connection with signals of high power and high speed. In particular, a fibre according to the invention is a fibre having the following features:

| | |
|---|---|
| (nominal) | λo = 1520 nm |
| distribution at 3s = | ±10 nm |
| slope of the dispersion curve at 1550 nm | Dc' = 0.06–0.08 ps/(nm$^2$ · km) |
| chromatic dispersion between 1530 and 1560 nm | Dc = 0.7–3 ps/(nm · km) |
| Efficient area = | 50–60 μm$^2$. |

Figure 12:
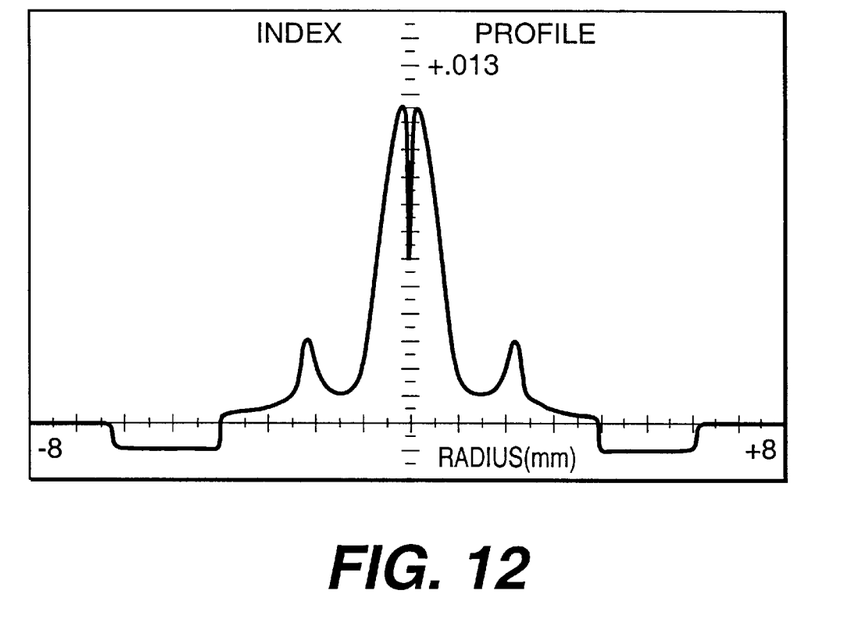
FIG. 12 shows the refractive index profile of the fibre of the spectrum shown in FIG. 11.
Figure 13:
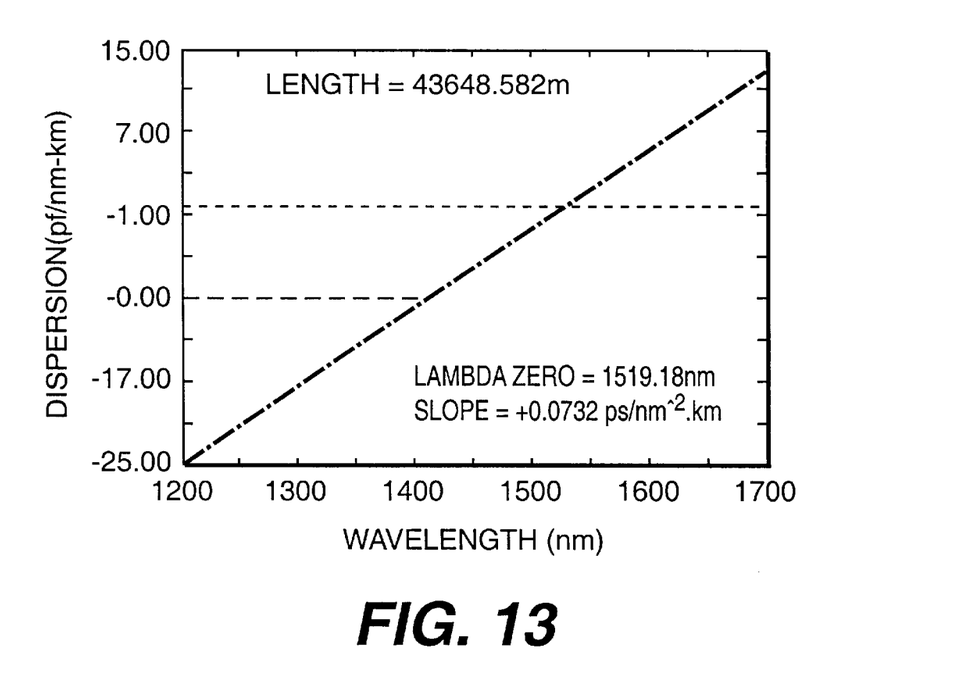
FIG. 13 shows the fibre dispersion curve of the spectrum in FIG. 11.

Respectively shown in FIGS. 12 and 13 is the diagram of the refractive index profile and the chromatic dispersion curve of the optical fibre of Experiment 8. The dispersion curve is substantially linear in the interval between 1200 and 1700 nm. The profile of the refraction index is of the "segmented-core" type. The same results are deemed to be achieved also with fibres of different profiles, obtained following various techniques, well known in the art, such as OVD, MCVD, VAD, provided that the wavelength bringing the chromatic dispersion to zero is selected from the stated ranges.

According to another aspect of the invention, it is possible to make an optical-fibre transmission line for a WDM transmission of data at high power and speed in which there is generation of FWM phenomena due to the non-linearity of the refractive index of the used optical fibre and over long distances. The related amplifiers are included, even if optical fibres of the DS type are used, that is fibres having a chromatic dispersion lower than 3 ps/(nm.km) and therefore capable of eliminating or reducing the temporal-widening phenomena of the transmitted pulses.

Figure 14:
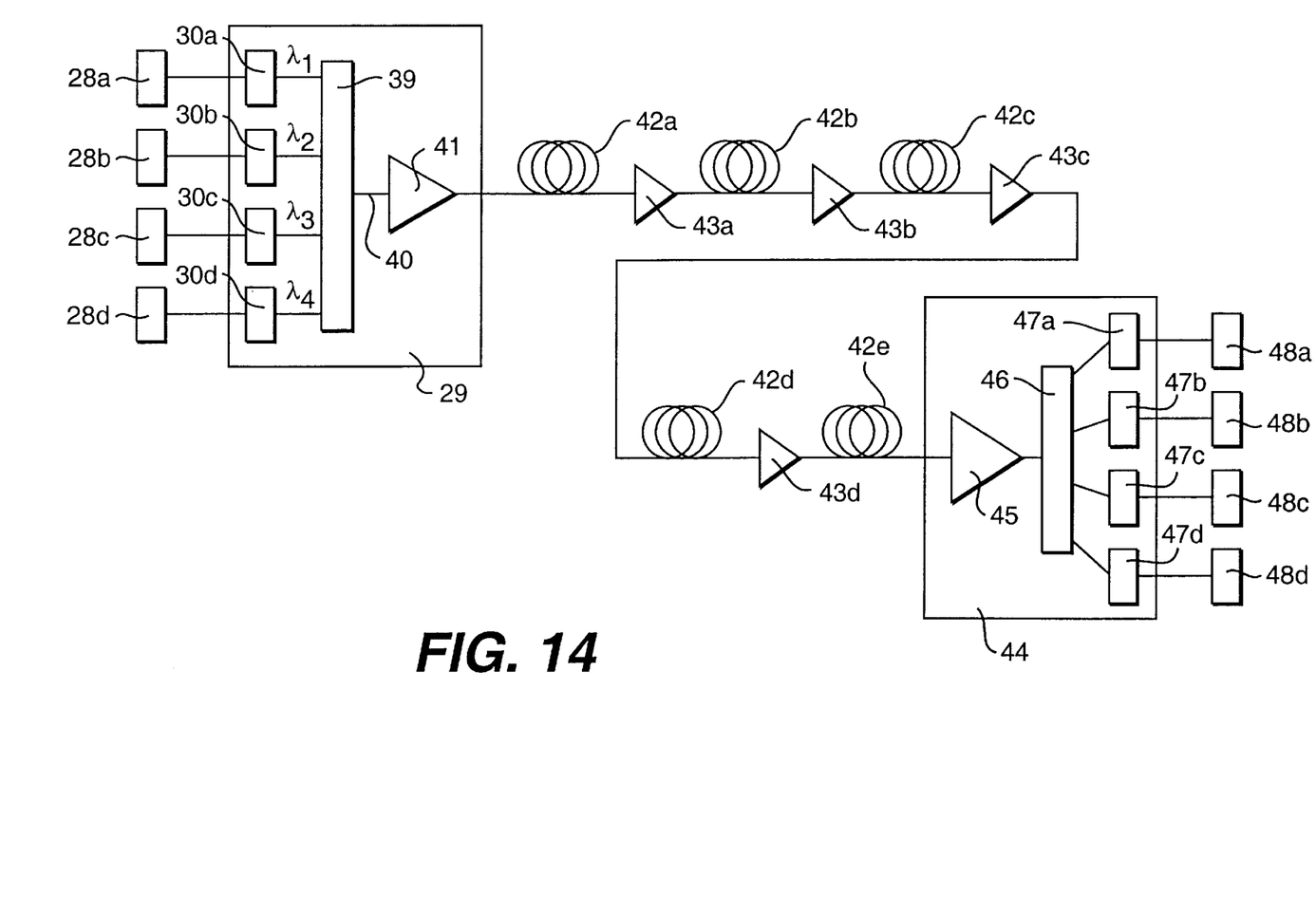
FIG. 14 depicts an example of an optical transmission system according to the invention.
Figure 15:
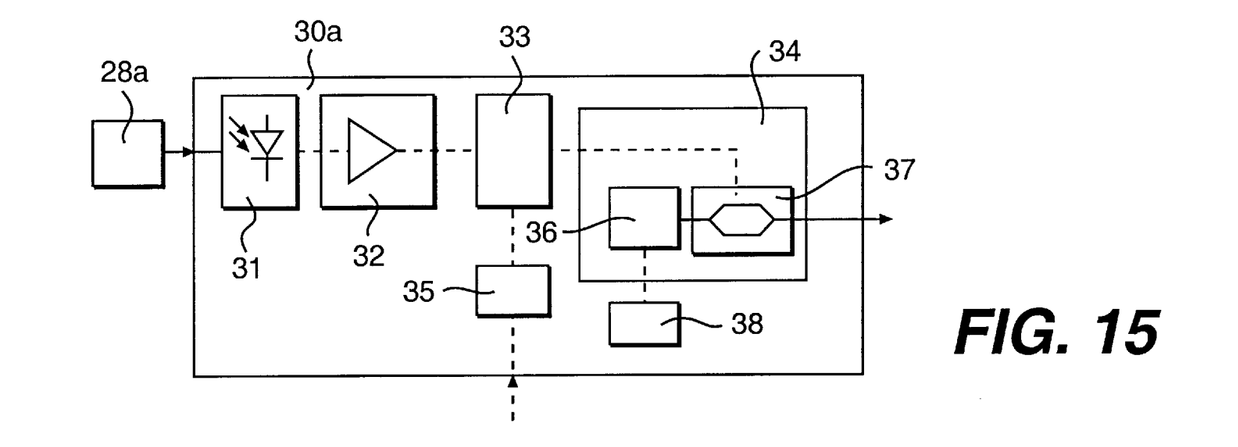
FIG. 15 depicts an example of an interfacing unit adapted to the system of FIG. 14.
Figure 16:
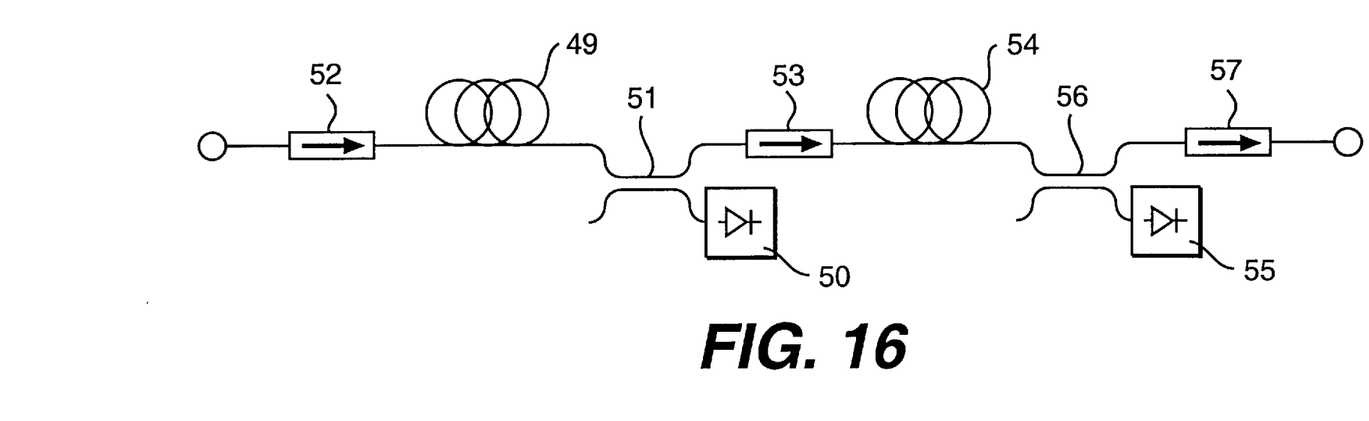
FIG. 16 is a diagram of a line amplifier.

A preferred embodiment of a multichannel WDM telecommunication system according to the invention is shown in the accompanying FIGS. 14 to 16. It provides several sources of optical origin signals, four in the example shown, 28a, 28b, 28c, 28d. Each of the signals, named "external signals," possesses its own transmission features such as wavelength, type of modulation, or power. The signals generated from these sources are fed to a transmission station 29, each of them being sent to a respective interfacing unit 30a, 30b, 30c, 30d. The interfacing units are adapted to receive the external optical origin signals, to detect them and to regenerate them, giving them new features adapted to the transmission system. In particular, the interfacing units generate respective optical transmission signals of wavelengths $\lambda 1$, $\lambda 2$, $\lambda 3$, $\lambda 4$ included in the useful operating band of the amplifiers disposed in succession in the system.

In U.S. Pat. No. 5,267,073 of the same assignee, the description of which is herein incorporated by reference, interfacing units are described which in particular comprise a transmission adapter, adapted to convert an optical input signal to a form suitable for the optical transmission line, and a reception adapter adapted to reconvert the transmitted signal to a form suitable for the receiving unit. For use in the system of the present invention, the transmission adapter preferably comprises a laser of the external modulation type as the laser generating an output signal.

A diagram of an interfacing transmission unit, of the type adapted for use in the present invention, is shown in FIG. 15, in which, for clarity purposes, optical connections are represented in solid lines and electrical connections are represented in dotted lines. The optical signal from one of sources 28a, 28b, 28c, 28d (source 28a for example as shown) is received by a photodetector (photodiode) 31, emitting an electric signal which is fed to an electronic amplifier 32. The outgoing electric signal from amplifier 32 is fed to a piloting circuit 33 of a modulated laser emitter, generally identified by 34, adapted to generate an optical signal at the selected wavelength, which contains the information of the incoming signal.

Conveniently, a circuit 35 for inserting a service channel is further connected to the piloting circuit 33. The modulated laser emitter 35 comprises a laser 36 and an external modulator 37, of the Mach-Zehnder type for example, piloted by the signal coming out of circuit 33. A circuit 38 controls the length of the emission wave of laser 36, keeping it constant to the preselected value, and compensating for possible external perturbations such as temperature and the like. Interfacing units of the type indicated for reception are described in the above patent and put on the market by Applicants' assignee, under the trade name TXT/E-EM.

Referring to FIG. 14, the optical communication signals are thereafter fed to a signal combiner 39, adapted to simultaneously send the signals at the wavelengths $\lambda 1$, $\lambda 2$, $\lambda 3$, $\lambda 4$ over a single optical output fibre 40.

In general, the signal combiner 39 is a passive optical device by which the optical signals transmitted on respective optical fibres are coupled in a single fibre; devices of this type consist for example of fused-fibre couplers in planar optics, microoptics and the like. By way of example, an appropriate combiner is a combiner 1×4 SMTC-0104-1550-A-H put on the market by E-TEK DYNAMICS INC., 1885 Lundy Ave, San Jose, Calif. (USA).

Through fibre 40, the communication signals, referred to in the following as S1, S2, S3, S4, are sent to a booster 41 that raises the level of the signals to a value sufficient to enable them to travel over the subsequent optical fibre portion before a new amplifying means is reached, keeping at the end a sufficient power level to ensure the required transmission quality. Therefore, a first portion 42a of optical fibre is connected to the amplifier 41, and it usually consists of a single-mode optical fibre of the step index type. The fibre is inserted in an appropriate optical cable which is some ten (or hundred) km long, 100 km long for example.

At the end of said first portion 42a of optical line, there is a first line amplifier 43a adapted to receive the signals, which are attenuated in the fibre path, and to amplify them to a level sufficient to enable them to be fed to a second optical fibre portion 42b having the same features as the preceding one. Subsequent line amplifiers 43b, 43c, 43d and respective optical fibre portions 42c, 42d, 42e cover the required overall transmission distance until they reach a receiving station 44. The receiving station 44 comprises a pre-amplifier 45 adapted to receive the signals and amplify them to compensate for the loss due to the following demultiplexing apparatus, to a power level adapted to the sensitivity of the receiving devices.

From pre-amplifier 45, the signals are sent to a demultiplexer 46 through which they are separated depending on the relative wavelengths. The signals are then sent to the interfacing units 47a, 47b, 47c, 47d, which are adapted to receive the optical signals having the characteristics suitable for the transmission system and to regenerate them to the original optical characteristics or other characteristics. At all events, the signals are adapted to the respective receiving apparatus 48a, 48b, 48c, 48d.

Demultiplexer 46 is a device adapted to distribute the optical signals fed to an input fibre among several output fibres, separating them depending on the respective wavelengths. This demultiplexer may consist of a fused-fibre divider dividing the input signal into signals on several output fibres, in particular four, where each of the signals is fed to a respective bandpass filter centered on each of the wavelengths of interest. For example, a component identical to the already described signal combiner 39 may be used, the same being mounted in an opposite configuration, combined with respective bandpass filters. Bandpass filters of the stated type are for example available from MICRON-OPTICS, INC., 2801 Buford Hwy, Suite 140, Atlanta, Ga., US; an appropriate model is FFP-100.

The described configuration gives particularly satisfactory results for transmissions over distances in the order of 500 km, at a high transmission speed, for example 2.5 Gbit/s (thereby achieving, with four multiplexed wavelengths, a transmission capacity corresponding to 10 Gbit/s on a single wavelength), with the use of four line amplifiers, one booster and one preamplifier.

To the ends of the present description and for the above use, the booster 41 is, for example, an optical fibre amplifier of a commercial type having the following features:

| | |
|---|---|
| input power | −5 to +2 dBm |
| output power | 13 dBm |
| work wavelength | 1530–1560 nm. |

The booster is devoid of a notch filter. An appropriate model is TPA/E-12, put on the market by Applicants' assignee. The amplifier uses an erbium-doped active optical fibre of the Al/Ge/Er type. "Booster" is intended to mean an amplifier operating under saturation conditions, the output power of which depends on the pumping power, as described in detail in the European Pat. No. EP 439,867, herein incorporated by reference.

To the ends of the present invention and for the above use, "pre-amplifier" is intended to mean an amplifier located at the extreme end of the line, capable of raising the signal to be fed to the receiver to a value conveniently higher than the sensitivity threshold of the receiver itself (from −26 to −11 dBm at the receiver inlet, for example), while at the same time introducing the minimum possible noise and maintaining the signal equalization. For example, for making pre-amplifier 45, a line amplifier using the same active fibre as amplifiers 43a–43c described in the following may be employed, or an amplifier may be expressly designed for the purpose, based on specific requirements. An appropriate model is RPA/E-MW, put on the market by Applicants' assignee.

The configuration of the above described transmission system is particularly appropriate to supply the desired performances, especially for a multichannel WDM transmission, in the presence of a particular selection of the properties of the line amplifiers being part of the system. In particular, the present invention provides the capability of transmitting the selected wavelengths without some of them being penalized with respect to others. Specifically, a uniform behavior for all channels can be ensured in the wavelength band included between 1530 and 1560 nm, in the presence of amplifiers adapted to operate in cascade, using line amplifiers designed to have a substantially uniform (or "flat") response to the different wavelengths, in a cascade operation.

For the above purpose, an amplifier intended for use as a line amplifier, is made according to the diagram shown in FIG. 16. The amplifier comprises one erbium-doped active fibre 49 and the respective pump laser 50, connected thereto through a dichroic coupler 51; one optoisolator 52 placed upstream of fibre 49 in the travel direction of the signal to be amplified; and a second optoisolator 53 located downstream of the active fibre itself. The amplifier further comprises a second erbium-doped active fibre 54 associated with the respective pump laser 55 through a dichroic coupler 56. Downstream of fibre 54 there is, therefore, another optoisolator 57. Alternatively, the line amplifier can be made in a single-stage configuration (not shown), based on the specific use requirements.

The preferred composition and optical features of the active fibres in the line amplifier are summarized in the following table:

| $Al_2O_3$ | | $GeO_2$ | | $La_2O_3$ | | $Er_2O_3$ | | | |
|---|---|---|---|---|---|---|---|---|---|
| % wt | (% mol) | % wt | (% mol) | % wt | (% mol) | % wt | (% mol) | NA | λc nm |
| 4 | (2.6) | 18 | (11.4) | 1 | (0.2) | 0.2 | (0.03) | 0.219 | 911 | wherein:
  % wt=percent content by weight of oxide in the core (average)
  % mol=percent content by moles of oxide in the core (average)
  NA=Numerical Aperture $(n1^2-n2^2)^{1/2}$
  λc=cutoff wavelength (LP11 cut-off).

Analyses of the compositions were carried out on a preform (before the fibre drawing) by a microprobe combined with a scanning electron microscope (SEM Hitachi). The analyses were conducted at 1300 magnifications on discrete points disposed along a diameter and separated from each other by 200 μm. The stated fibres were made by the vacuum plating technique within a tube of quartz glass. In the fibres the incorporation of germanium as the dopant in the $SiO_2$ matrix in the fibre core was obtained during the synthesis step. The incorporation of erbium, alumina and lanthanum into the fibre core was obtained by the so-called "doping-in-solution" technique, in which an aqueous solution of dopant chlorides is brought into contact with the synthesis material of the fibre core, while this material is in the particulate state, before hardening of the preform. More details concerning the doping-in-solution technique can be found for example in U.S. Pat. No. 5,282,079, which is herein incorporated by reference. The pump lasers 50, 55 preferably are lasers of the Quantum Well type, having the following features:

| | |
|---|---|
| emission wavelength | $\lambda p$ = 980 nm |
| maximum optical output power | Pu = 80 mW. |

Lasers of the stated type are produced by LASERTRON INC., 37 North Avenue, Burlington, Mass. (USA), for example.

Dichroic couplers of the type stated are known and commercially available and are produced for example by GOULD Inc., Fibre Optic Division, Baymeadow Drive, Glen Burnie, Md. (USA), and by SIFAM Ltd., Fibre Optic Division, Woodland Road Torquay Devon (GB).

Optical isolators 52, 53, 57 are optical isolators in which the polarization control is independent of the transmission signal polarization and have an isolation greater than 35 dB and reflectivity lower than −50 dB. The isolators herein used are a MDL I-15 PIPT-A S/N 1016 model available from ISOWAVE, 64 Harding Avenue, Dover, N.J., USA.

In the described system the line amplifiers are provided for operation with an overall optical output power of about 14 dBm, with a gain of about 30 dB. An appropriate model is OLA/E-MW, commercialized by Applicants' assignee.

On describing the present invention, when not specified otherwise, wavelength bringing the chromatic dispersion to zero in the fibre (λo) is intended to mean the nominal (or average) value that can be measured through the phase shift technique reported as the reference method in the already mentioned ITU-T G.650 Recommendation, obtained by tests on fibres longer than 1 km, based on which the overall chromatic dispersion of the fibre portion under examination can be calculated.

In addition, by "local" wavelength bringing the chromatic dispersion to zero in the fibre (local λo), it is intended to mean the value that λo can locally take, following fluctuations in the fibre structure, over fibre portions of limited length, sufficient to cause the generation of FWM peaks in the case in which the peaks are in correspondence or in functional relation with the transmission channels. This length practically depends, among other things, on the optical power present in the fibre for the different channels and on the fact that the FWM peaks may be subjected to amplifications. Just as an indication, lengths of some hundred meters can give important effects.

According to one aspect of the present invention, it has been found that, for reducing the noise effects due to FWM in a multiwavelength transmission system, it is not sufficient to use fibres having a nominal (or average) chromatic dispersion value that is not zero in the transmission signal band, but it is also necessary that the nominal (or average) chromatic dispersion of the fibre becomes zero at a wavelength value which is lower than and sufficiently far from the minimum wavelength value provided for transmission. In addition, it has been found that, for increasing the maximum connection distance, without undergoing penalties from FWM, it is necessary to correspondingly increase the distance between the wavelength value bringing the chromatic dispersion to zero and the minimum wavelength of the transmission channels. According to the present invention, it is also possible to carry out an optical signal transmission in an amplified multichannel WDM transmission line using optical fibres of the DS type, by a process providing the step of establishing the (average) wavelength value for bringing the chromatic dispersion to zero in the fibres and establishing the local zero values of the chromatic dispersion in the same fibres. Based on these values, the transmission band is then selected, so that it is separated from the average value of the fibre chromatic dispersion by such an amount that none of the local zero values is included in the transmission band itself. Alternatively, the optical fibres used for transmission are selected such that the (average) zero value of the chromatic dispersion in the fibres is sufficiently far from the band used for WDM transmission to prevent portions of important length of the fibres from having a local zero value of the chromatic dispersion falling within the transmission band. According to the invention, working with 980 nm pumped amplifiers, it was observed that the transmission band could extend until about 1530 nm, and it was found that the problem was linked not only to the maximum value, but also to the local zero value of the dispersion.

The present invention has been described in detail in connection with the wavelength division multiplexing technique and the four-wave-mixing phenomenon associated thereto. However, it must be noted that also other non-linear phenomena, associated with the propagation in optical fibres, are similarly influenced by the dispersion value of the fibres and by the constance of its zero value along the fibres' length, and accordingly will take benefit out of the present invention. An example of the above is the high speed optical transmission in non-linear propagation conditions. In particular, in the case of soliton propagation in dispersion shifted fibres, it has been observed that when the fibre line along which the soliton propagation takes place includes portions of a given length (of the order of some kilometers, for example 5 km, or more) having negative chromatic dispersion values (normal dispersion), the soliton pulse propagation becomes strongly perturbed, with a significant increase of the soliton spectral width (for example, a significant increase of the soliton spectral width is greater than about 10%). This is due to the fact that, in these fibre portions, the compensation between the dispersion chirping and the phase modulation chirping is missing. The word "chirping" means a variation in the instantaneous frequency of the optical carrier.

The pulse degradation that takes place when the solitons are propagated in the so-called "normal" dispersion fibres (i.e. in fibres having a negative dispersion), due to its non-linearity nature is only partially recovered in a subsequent propagation in a length of "anomalous" dispersion fibre or fibres (i.e. in fibres having a positive dispersion). Accordingly, also in this kind of transmission, it is very important that the fibres used in the line have practically no $\lambda_o$ values in the wavelength range used for the soliton transmission, as provided for in the present invention. The minimum critical fibre length having normal dispersion beyond which this phenomenon becomes of relevance is reduced with the increase of the signal bit-rate. Accordingly, the use of the fibre according to the present invention will be of particular importance for optical links operating at more than 10 Gbit/s, more in particular at 40 Gbit/s or greater speed, and the tolerances associated thereto will become more stringent. With a fibre according to the present invention, having a nominal $\lambda_o$ value in the 1500–1520 nm range, moreover, a soliton transmission can be made using a broad wavelength band, practically extended to the whole available range of the optical amplifiers.

Other embodiments of the invention will be apparent to those skilled in the art from consideration of the specification and practice of the invention disclosed herein. It is intended that the specification and examples be considered as exemplary only, with a true scope and spirit of the invention being indicated by the following claims.

We claim:

1. An optical fibre for transmitting at least two optical signals separated by less than 2 nm in a predetermined transmission wavelength band of about 1530–1560 nm, characterized in that the optical fibre has an overall chromatic dispersion increasing with wavelength and lower than a predetermined value in said band, and has a zero value at less than about 1525 nm, such that no local zero value of chromatic dispersion present in the fibre over a length portion capable of generating intermodulation peaks of said signals, is included in said band.

2. The optical fibre according to claim 1, wherein zero values of the local chromatic dispersion differ by less than 10 nm from the zero value of the overall chromatic dispersion in the fibre.

3. The optical fibre according to claim 1, wherein said overall chromatic dispersion is lower than 3 ps/(nm.km) in said transmission band and becomes zero for a value lower by at least 10 nm than the minimum wavelength value of said band.

4. The optical fibre according to claim 1, wherein the fibre has a length greater than 5 km and a chromatic dispersion of such a value that intermodulation peaks are not generated in the presence of at least two optical signals over several channels of different wavelengths, having a power of at least 3 mW per channel fed to a fibre end, and the intensity of which causes a signal/noise ratio equal to or greater than 20 dB.

5. An optical fibre for transmitting optical signals sensitive to non-linear phenomena in a predetermined transmission wavelength band of about 1530–1560 nm, characterized in that the optical fibre has an overall chromatic dispersion increasing with wavelength and lower than a predetermined value in said band, and has a zero value at less than about 1525 nm, such that no local zero value of chromatic dispersion present in the fibre over a length portion capable of generating spectral modification of said signals, is included in said band.

6. The optical fibre according to claim 5, wherein zero values of the local chromatic dispersion differ by less than 10 nm from the zero value of the overall chromatic dispersion in the fibre.

7. The optical fibre according to claim 5, wherein said overall chromatic dispersion is lower than 3 ps/(nm.km) in said transmission band and becomes zero for a value lower by at least 10 nm than the minimum wavelength value of said band.

8. The optical fibre according to claim 5, wherein said predetermined transmission wavelength band ranges from 1540 to 1560 nm.

* * * * *